United States Patent [19]

Galt et al.

[11] Patent Number: 5,713,503
[45] Date of Patent: Feb. 3, 1998

[54] FILM TRANSPORT MECHANISM HAVING AUTOMATIC STROKE ADJUSTMENT

[75] Inventors: John James Galt; James Bernard Pearman, both of Glendale, Calif.

[73] Assignees: Sony Corporation, Tokyo, Japan; Sony Electronics Inc., Park Ridge, N.J.

[21] Appl. No.: 781,396

[22] Filed: Jan. 10, 1997

[51] Int. Cl.$^6$ .......................... B65H 23/18; B23Q 16/00; G03B 1/28
[52] U.S. Cl. .................... 226/32; 226/45; 226/57
[58] Field of Search .............. 226/32, 45, 57, 226/143

[56] References Cited

U.S. PATENT DOCUMENTS

| | | | |
|---|---|---|---|
| 3,568,584 | 3/1971 | Harvey | 226/45 X |
| 4,420,107 | 12/1983 | Seyffert et al. | 226/32 |
| 4,455,549 | 6/1984 | Rydbom | 226/45 X |
| 4,702,577 | 10/1987 | Weigert | 226/57 X |
| 5,376,961 | 12/1994 | Galt et al. | 348/105 |
| 5,392,080 | 2/1995 | Galt et al. | 353/84 |
| 5,394,263 | 2/1995 | Galt et al. | 359/227 |
| 5,428,387 | 6/1995 | Galt et al. | 348/97 |

*Primary Examiner*—Michael Mansen
*Attorney, Agent, or Firm*—Pasquale Musacchio, Esq.; Jerry A. Miller

[57] ABSTRACT

A film transport mechanism for transporting film having perforations including a motor that drives sprockets for transporting the film in increments defined by a pull down stroke. In addition, the mechanism includes a pin element having at least one pin, the pin element being rotatable to a first position wherein the pin is inserted into an associated perforation to stabilize the film without contacting a perforation edge to generate a first sound level when the pull down stroke substantially equals a perforation pitch. Further, when the pitch is not equal to the pull down stroke, the pin contacts a perforation edge to generate a second sound level. The mechanism also includes a microphone positioned adjacent the pin element and the film for detecting a range of sound levels. An acoustic analyzing circuit is provided for comparing a sound level detected by the microphone to an acoustic signature indicative of contact between the pin and a perforation edge wherein when the detected sound level substantially matches the acoustic signature, the circuit controls the drive means to adjust the pull down stroke until the first sound level is detected wherein the pull down stroke is substantially equal to the pitch and thus the pin is inserted into a perforation without contacting a perforation edge.

10 Claims, 3 Drawing Sheets

FILM TRANSPORT MECHANISM HAVING AUTOMATIC STROKE ADJUSTMENT

The disclosures of U.S. Pat. Nos. 5,376,961, 5,392,080, 5,394,263 and 5,428,387 are hereby incorporated by reference.

FIELD OF THE INVENTION

The present invention relates to telecine systems, and more particularly to a film transport mechanism for a telecine system which compares detected sound with an acoustic signature to automatically adjust a pull down stroke of the mechanism such that it is equal to a perforation pitch of the film being transported.

BACKGROUND OF THE INVENTION

Film to video transfer systems (telecine) systems have been developed for converting motion picture film images into conventional NTSC and PAL video signal formats and the SMPTE-240M high definition video format. Typically, such systems utilize a film transport mechanism having either an intermittent projector type movement or a continuous transport movement to advance the film. Currently, continuous transport movements are widely used since this type of movement enables high speed shuttle operation with relatively gentle film handling. However, a disadvantage of both types of transport mechanisms is their inability to provide a completely steady image at a desired nominal sound speed of 24 fps.

A pin registration system, similar to that used in a film camera movement, is frequently used in conjunction with the intermittent projector movement in order to provide a relatively stable image. In particular, such systems register on the perforations of the film to hold the film steady during film exposure. However, there are disadvantages with utilizing this approach in a telecine system. Cameras use unexposed raw film which is relatively stable dimensionally and which complies with American National Standards Institute (ANSI) dimensional standards for raw film. Further, film in a camera is typically transported only once or twice through the camera during exposure of the film. Therefore, a film movement which is preset to the ANSI dimensional standards will safely transport the film once or twice with relatively little perforation damage.

In a telecine system, however, processed film is used which may vary greatly in its dimensional tolerances as a function of processing and storage conditions. Referring to FIG. 1, a chart depicting perforation tolerances for processed 35 mm film is shown. In particular, it can be seen that the tolerances frequently exceed the ANSI dimensional standards. As a result, a mismatch occurs between the amount that the film is advanced, or the pull down stroke, and the perforation pitch. This causes undesirable contact between the pin registration system and the edges of the perforations thus resulting in perforation damage. Further, the processed film may be transported back and forth through the film gate approximately 20 times or more thus causing further damage to the perforation edges. In order to avoid such damage, the movement would have to be adjusted to the particular pitch dimensions of the film being transported. However, this is a lengthy process requiring a great degree of skill and which results in a substantial amount of down time. Additionally, it is not uncommon for the perforation pitch to vary from the beginning of a film reel to the end of the reel, thus requiring further adjustments and resulting in additional down time.

SUMMARY OF THE INVENTION

A film transport mechanism for transporting film having perforations is disclosed. The mechanism includes a motor that drives sprockets for transporting the film in increments defined by a pull down stroke. In addition, the mechanism includes a pin element having at least one pin, the pin element being rotatable to a first position wherein the pin is inserted into an associated perforation to stabilize the film without contacting a perforation edge to generate a first sound level when the pull down stroke substantially equals a perforation pitch. Further, when the pitch is not equal to the pull down stroke, the pin contacts a perforation edge to generate a second sound level. The mechanism also includes a microphone positioned adjacent the pin element and the film for detecting a range of sound levels. An acoustic analyzing circuit is provided for comparing a sound level detected by the microphone to an acoustic signature indicative of contact between the pin and a perforation edge wherein when the detected sound level substantially matches the acoustic signature, the circuit controls the drive means to adjust the pull down stroke until the first sound level is detected wherein the pull down stroke is substantially equal to the pitch and thus the pin is inserted into a perforation without contacting a perforation edge.

These and other objects, advantages and features of the invention will become apparent to those skilled in the art upon consideration of the following description of the invention.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE INVENTION

Figure 1:
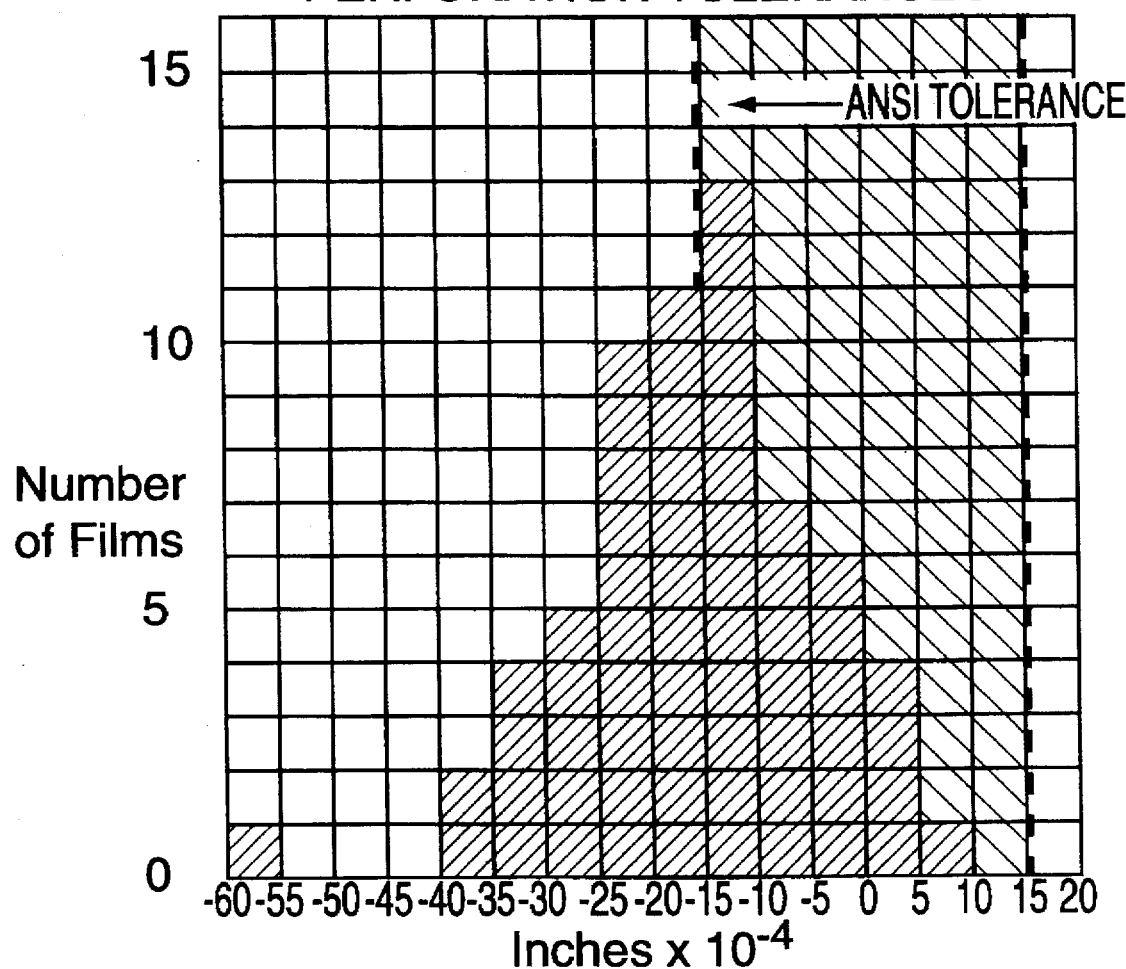
FIG. 1 is a chart depicting perforation tolerances for processed film.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in FIGS. 1–3.

Figure 2:
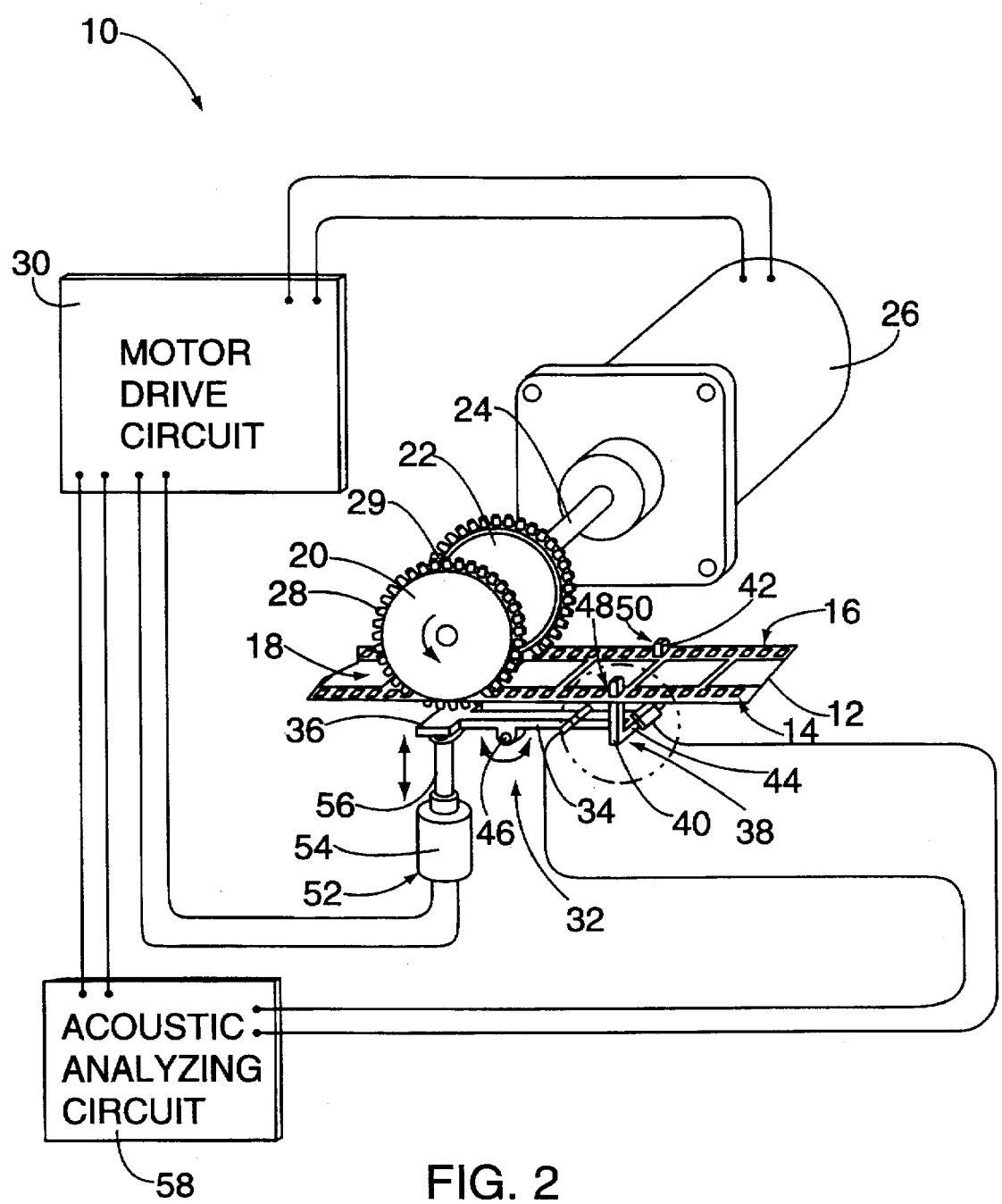
FIG. 2 is a view of a film transport mechanism in accordance with the present invention.

Referring to FIG. 2, a film transport system 10 for a projector system in accordance with the present invention is shown. In particular, the system 10 serves to advance film 12, such as 35 mm format film, having first 14 and second 16 rows of perforations which are separated by images 18 formed on a center portion of the film 12. The system 10 includes first 20 and second 22 sprockets which are affixed to an output shaft 24 of a drive motor 26. The first 20 and second 22 sprockets include first 28 and second 29 sets of sprocket teeth which engage the first 14 and second 16 rows of perforations, respectively. In operation, the motor 26 rotates the shaft 24 so as to cause intermittent rotation of the first 20 and second 22 sprockets and thus intermittent transport of the film 12 from frame to frame to provide a pull down stroke. A drive circuit 30 is utilized to control the motor 26 to provide desired rotation of the shaft 24.

Figure 3:
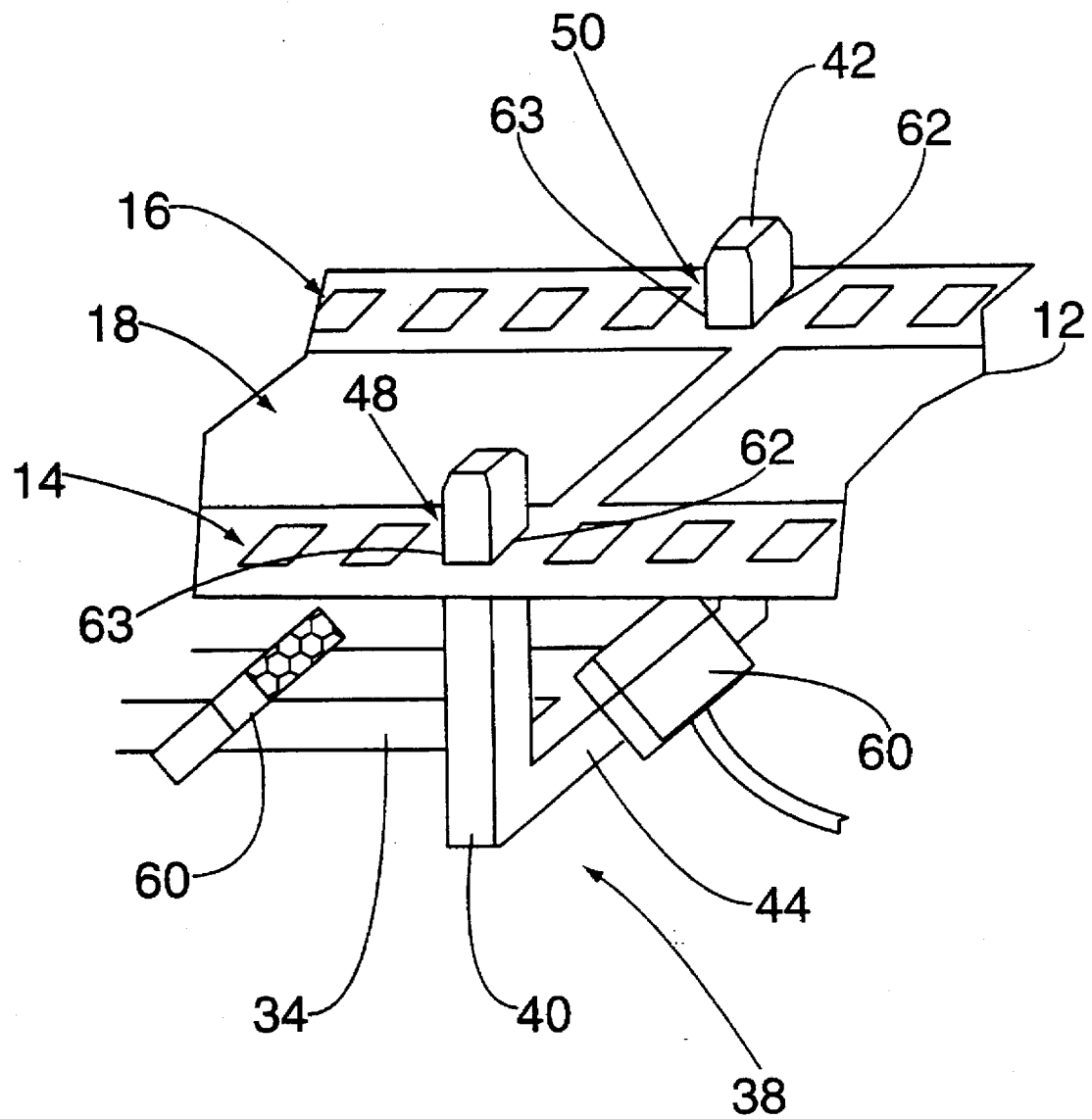
FIG. 3 is an enlarged view of a pin element is shown.

The system 10 further includes a registration element 32 having a center section 34 which is located between a flat section 36 and a pin element 38. Referring to FIG. 3 in conjunction with FIG. 2, an enlarged view of the pin element 38 is shown. The pin element 38 includes spaced apart first 40 and second 42 upstanding registration pins which extend from a base section 44 to form a substantially U-shaped configuration. The center section 34 is rotatably attached by a pin 46 to enable clockwise and counterclockwise rotation of the registration element 32 and thus the first 40 and second 42 pins. In a first position, the registration element 32 is rotated counterclockwise such that the first pin 40 is inserted into an associated first perforation 48 from the first row of perforations 14 and the second pin 42 is inserted into an associated second perforation 50 from the second row of perforations 16 to provide registration of the film 12. In a second position, the registration element 32 is rotated clockwise such that the first 40 and second 42 pins are removed from their associated perforations 48, 50 to enable advancement of the film 12.

In addition, the system 10 includes a solenoid 52 having a body 54 and a plunger 56 which is rotatably attached to the flat section 36. Activation of the solenoid 52 causes the plunger 56 to move vertically upward out of the body 54. This causes clockwise rotation of the registration element 32 into the second position wherein the first 40 and second 42 pins are removed from their associated perforations 48, 50. Further, deactivation of the solenoid 52 causes the plunger 56 to retract vertically downward. This causes counterclockwise rotation of the registration element 32 into the first position wherein the first 40 and second 42 pins are inserted into their associated perforations 48, 50. Further, the drive circuit 30 is adapted to activate and deactivate the solenoid 52.

In a telecine system, processed film is used which varies greatly in its dimensional tolerances as a function of processing and storage conditions. As a result, a mismatch occurs between the pull down stroke and the perforation pitch. This causes undesirable contact between the first 40 and second 42 pins and either the leading 62 or trailing 63 perforation edges of the associated perforations 48, 50. It has been found that such contact generates a sound having an acoustic signature indicative of the contact. Further, it has been found that when the perforation pitch and the pull down stroke are substantially the same, and thus no contact occurs between the first 40 and second 42 pins and either of the perforation edges 62, 63, that relatively quieter operation results than when a mismatch exists.

In accordance with the present invention, the system 10 includes an acoustic analyzing circuit 58 which is electrically connected between at least one miniature microphone 60 and the drive circuit 30. The microphone 60 is located in close proximity to the first 40 and second 42 pins and the associated perforations 48, 50 to detect a range of sound levels which are generated therein. Signals from the microphone 60 are then received by the acoustic analyzing circuit 58. The acoustic analyzing circuit 58 is adapted to compare selected parameters of the signal, such as amplitude, with a predetermined acoustic signature indicative of contact between the first 40 and second 42 pins and either of the perforation edges 62, 63. In addition, the acoustic analyzing circuit 58 compares the signal to determine whether or not a predetermined minimum sound level is detected which indicates that no contact occurred between the first 40 and second 42 pins and either of the perforation edges 62, 63. If the sound detected matches the acoustic signature, the acoustic analyzing circuit 58 generates a signal for controlling the drive circuit 30 to ultimately adjust rotation of the shaft 24 until the sound level is decreased to the minimum level. At the minimum level, no contact occurs between the first 40 and second 42 pins and either of the perforation edges 62, 63. Therefore, the pull down stroke and the perforation pitch are substantially equal to each other and the amount of damage to the perforation edges 62, 63 is substantially reduced. Further, as the perforation pitch changes as the film is transported, this process is repeated until the pull down stroke again substantially equals the new perforation pitch.

By digitizing the sound of the movement in operation, a computer program can be used to analyze the acoustic signature of the movement in its various phases of operation. In this manner, in addition to insuring the correct relationship between perforation pitch and pull down stroke, it is also possible to determine when maintenance on the movement is necessary.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. This includes use in other systems such as automobile engine timing subsystems and electrical generator loading. Accordingly, it is intended that the present invention embrace all such alternatives, modifications and variations are far within the scope of the appended claims.

What is claimed is:

1. A film transport mechanism for transporting film having perforations, comprising:

drive means for transporting said film in increments defined by a pull down stroke;

a pin element having at least one pin, said pin element being rotatable to a first position wherein said pin is inserted into an associated perforation to stabilize said film without contacting a perforation edge to generate a first sound level when said pull down stroke substantially equals a perforation pitch, and wherein when said pitch is not equal to said pull down stroke, said pin contacts a perforation edge to generate a second sound level;

a microphone positioned adjacent said pin element and said film for detecting a range of sound levels; and an acoustic analyzing circuit for comparing a sound level detected by said microphone to an acoustic signature indicative of contact between said pin and a perforation edge wherein when said detected sound level substantially matches said acoustic signature, said circuit controls said drive means to adjust said pull down stroke until said first sound level is detected wherein said pull down stroke is substantially equal to said pitch and thus said pin is inserted into a perforation without contacting a perforation edge.

2. The mechanism according to claim 1, wherein said drive means includes a drive motor having a pair of sprockets for registering on said perforations and a drive circuit for controlling said motor.

3. The mechanism according to claim 1, wherein said pin element includes two pins.

4. The mechanism according to claim 1 further including a solenoid for rotating said pin element.

5. A film transport mechanism for transporting film having perforations, comprising:
- a motor having an output shaft for rotating a pair of sprockets each having teeth, wherein said teeth register on said perforations and wherein said motor transports said film in increments defined by a pull down stroke;
- a pin element having at least one pin, said pin element being rotatable to a first position wherein said pin is inserted into an associated perforation to stabilize said film without contacting a perforation edge to generate a first sound level when said pull down stroke substantially equals a perforation pitch, and wherein when said pitch is not equal to said pull down stroke, said pin contacts a perforation edge to generate a second sound level and wherein said pin is rotatable to a second position in which said pin is removed from said perforation to enable transport of said film;
- a microphone positioned adjacent said pin element and said film for detecting a range of sound levels; and
- an acoustic analyzing circuit for comparing a sound level detected by said microphone to an acoustic signature indicative of contact between said pin and a perforation edge wherein when said detected sound level substantially matches said acoustic signature, said circuit controls said drive means to adjust said pull down stroke until said first sound level is detected wherein said pull down stroke is substantially equal to said pitch and thus said pin is inserted into a perforation without contacting a perforation edge.

6. The mechanism according to claim 5, further including a drive circuit for controlling rotation of said shaft.

7. The mechanism according to claim 5, wherein said pin element includes two pins.

8. The mechanism according to claim 5 further including a solenoid for rotating said pin element.

9. A method for adjusting a pull down stroke for a film transport mechanism for transporting film having perforations, comprising the steps of:
- detecting sound caused by a registration element entering a perforation;
- comparing said detected sound with an acoustic signature indicative of contact between said registration element and a perforation edge, wherein when no contact occurs, a first sound level is generated; and
- adjusting said pull down stroke such that said first sound level is detected.

10. The mechanism according to claim 9, wherein said pin element includes two pins.

\* \* \* \* \*